United States Patent [19]

Clausen et al.

[11] 4,231,742

[45] Nov. 4, 1980

[54] MANUFACTURE AND USE OF HEAT TRANSFER PRINTINGS

[75] Inventors: Dieter Clausen, Baldham; Albert Uhlemayr, Forstinning, both of Fed. Rep. of Germany

[73] Assignee: Michael Huber Munchen, GmbH, Munich, Fed. Rep. of Germany

[21] Appl. No.: 16,215

[22] Filed: Feb. 28, 1979

Related U.S. Application Data

[63] Continuation of Ser. No. 855,530, Nov. 28, 1977, abandoned.

[30] Foreign Application Priority Data

Dec. 2, 1976 [DE] Fed. Rep. of Germany ....... 2654651

[51] Int. Cl.³ .................................................. D06P 1/08
[52] U.S. Cl. ............................................ 8/470; 8/467; 106/22; 204/159.23; 204/159.15; 427/54.1; 427/148
[58] Field of Search ...................... 204/159.14, 159.23; 427/54, 148, 152, 54.1; 8/2.5 A, 2.5 R; 90/28; 106/20, 21, 22, 74.5

[56] References Cited

U.S. PATENT DOCUMENTS

| | | | |
|---|---|---|---|
| 3,673,140 | 6/1972 | Ackerman et al. | 260/22 TN |
| 3,713,864 | 1/1973 | Ackerman et al. | 117/38 |
| 3,775,113 | 11/1973 | Bonham et al. | 96/28 |
| 3,876,432 | 4/1975 | Carlick et al. | 96/115 P |
| 3,944,422 | 3/1976 | Nihyakumen et al. | 96/49 |
| 3,978,247 | 8/1976 | Braudy et al. | 427/43 |
| 3,986,874 | 10/1976 | Marsh | 96/27 R |
| 4,016,333 | 4/1977 | Gaske et al. | 428/447 |
| 4,041,204 | 8/1977 | Hepher | 428/199 |

*Primary Examiner*—Wilbert J. Briggs, Sr.
*Attorney, Agent, or Firm*—Karl W. Flocks

[57] ABSTRACT

Heat Transfer prints are made by offset printing using a UV curable ink containing subliminal dyes printed onto a heat transfer backing, followed by rapid curing using UV light. The heat transfer prints are then used for dying fabric by applying the heat transfer print to the fabric, heating the print and thereby causing the dyes to sublimate and thereby transfer from the heat transfer print to the fabric where dying of the fabric occurs.

11 Claims, No Drawings

MANUFACTURE AND USE OF HEAT TRANSFER PRINTINGS

This is a Continuation of co-pending application Ser. No. 855,530, filed Nov. 28, 1977, and now withdrawn in favor of the present case now abandoned.

FIELD OF INVENTION

The present invention relates to transfer printing, and, more particularly, to printing inks useful in transfer printing.

BACKGROUND OF THE INVENTION

Under the conditions of thermo-printing or transfer printing, sublimable dyes are transferred through heating from an auxiliary image support to the substrate to be printed, and are then fixed on the substrate, e.g., a textile fabric made of synthetic resin fibers, the fixing being effected through diffusion or dissolving into the fibrous material, the dyes thereby producing the desired colored images on the textile. As textile materials suitable for transfer printing, there are commonly used synthetic fibrous materials such as polyamides, polyesters, polyacrylonitriles and also cellulose fibers finished with synthetic resin. As the auxiliary image support, one uses generally in this connection paper sheets or metal foil, such as aluminum foil, on which the printing inks are applied by means of intaglio printing. As printing-ink binders suitable for this kind of printing, one uses in particular the cellulose esters, e.g., ethyl cellulose, in which connection one must use organic solvents.

However, it is also known to prepare such thermo-printing transfer papers through offset or letter printing, which introduces known advantages in relation to intaglio printing. Smaller editions can thus be produced without difficulty by means of this printing technique. Besides, offset or letter printing exhibits the advantage of omitting volatile organic solvents in the printing pastes, which leads to an acceleration of the printing operation, and, beyond that, introduces economic advantages.

In order to allow faster processing of the oily moist transfer-printing papers initially obtained in connection with offset printing, the German disclosed specification DT-OS 24 08 900 indicates the addition of gelling agents, such as aluminum chelate, in the amounts of up to 2% by weight to the printing-ink masses. This indeed produces a print which solidifies very rapidly on the surface; however, it has been shown quite generally that difficulties in regard to the reproducibility of color tones and color intensity of the thermo-transfer prints occur in connection with color images printed in accordance with the offset procedure. This is based on the fact that standard preparations are employed as binders for the manufacture of the printing inks for the thermo-printing papers through offset printing, such preparations being obtained on the basis of drying oils, such as linseed oil and mineral oils, unsaturated alkyd resins, hard resins or the like. As is well known, such printing inks dry up only very slowly through oxidation and, under the effect of air oxygen, attain a more or less definitive final state of crosslinking and, therewith, drying and hardening or curing only after a number of days.

This fact plays only a subordinate role in ordinary offset printing and is compensated and masked by other advantages offered by offset printing. However, in the preparation of thermo-transfer printing papers, hereafter referred to as "heat-transfers", it has turned out that oxidative curing is of influence because it was shown that the dyes used for the thermo-transfer printing, e.g., the readily sublimable anthraquinone or diazo dyes, are also oxidized in part during the crosslinking and hardening by oxidation of the binders used in the offset printing paste. Thus, after only a short storage period, this leads to color tone changes, e.g., fading or loss of brilliance, etc., when the dyes are transferred to the textile. Both in the case where such sublimable dyes are used alone and, especially, also in the case of dye mixtures that are required for obtaining the desired richness of shade, distinct differences in regard to tones and effect of the color images obtained through the transfer printing of textiles result within the drying time and then also during storage.

For the manufacturer of heat-transfers, e.g., the printer, this makes it very difficult or even impossible to exercise a precise control of his dye composition and color in the printing ink in regard to the result on the textile to be later obtained through transfer printing. While it is true that the oxidizing hardening of the offset printing inks can be accelerated through catalysts or by heating, catalysts also promote the undesirable oxidation of the dyes, and heating is conceivable only with the use of dyes possessing a high temperature of sublimation. These methods thus cannot be used practically in the manufacture of heat-transfers, especially since one must here use dyes that should sublime on heating as quickly as possible and as completely as possible.

SUMMARY OF THE INVENTION

It has now been found that it is possible to manufacture heat-transfer even in accordance with the offset and letter-printing methods, which no longer exhibit the hitherto-existing disadvantages of the products produced with such printing methods, if there is used for the formulation of the sublimable dyes in the preparation of printing inks for the heat transfers, a binder system which immediately hardens through UV radiation. As suitable binders there may be mentioned ethylenically unsaturated monomers and prepolymers that can be polymerized through free radicals, e.g., the ester compounds of mono or di-acrylic acid, to which UV polymerization initiators are added.

DETAILED DESCRIPTION OF EMBODIMENTS

German Auslegeschrift 24 38 712 describes particularly useful radiation hardened printing-ink binders that can be used in accordance with the present invention for the preparation of heat-transfers. Beside such curable binders that contain polyfunctional arylate esters of polyhydric alcohols as polymerizable component, one can also use other polymerizable resin preparations having polymerizable ethylenic unsaturation in the novel offset printing inks for the transfer printing, which preparations can rapidly be hardened and crosslinked through UV-initiators and radiation, as known for a long time as coating materials used for a very great variety of purposes. These include, for example, trimethylolpropane triacrylate or methacrylate, glycol diacrylate, 2-hydroxypropyl acrylate, vinyl pyrrolidone, soybean oil expoxidized and then reacted with acrylic acid, the linseed-oil alkyd obtained through the use of trimethylol propane esters of isophthalic acid, cyclohexanone-formaldehyde resin, as well as the reaction product of bisphenol, epichlorhydrin and acrylic acid. By mixing several components, the normally skilled artisan can in a simple manner adjust the consistency and the hardening properties of the printing inks.

As UV-polymerization initiators for the printing inks of the invention, one can use any substances that possess a triplet energy between 42–85 kcal/mol. For example, benzoin ether, benzoin urethane derivatives, acetophenone, Michler's ketone, benzophenone as well as its derivatives, benzoyl-benzalchloride and especially benzildimethyl ketal have proven to be especially suitable.

It is unexpected that, in spite of the intensive hardening and crosslinking of the binder, especially on the surface of the dye coating on the heat transfer, the transfer of the sublimable dye is not affected during the later transfer printing, i.e. during the sublimation of the dyes from the heat transfer onto the textile material. Moreover, in spite of the relatively high concentration of sublimable dyes in such offset printing ink materials the UV initiators bring about a sufficient hardening of the oily, hydrophobic printing material on the heat transfers during the irradiation which lasts only fractions of a second.

Thus, when polymerizable binders and UV activators are of a suitable composition, radiation exposure times of 0.1–0.3 seconds can lead to the desired immediate hardening of the prints on the heat-transfer backing, so that the printer is then immediately ready to test the so obtained heat transfer to determine its transfer-printing properties without the need to fear that the color images would change after storage. Since the hardening of the binder is not brought about through oxidizing, time-dependent procedures, the dyes remain unchanged. Accordingly, the heat transfers obtained in accordance with the invention can thus be stored practically indefinitely. Since the radiation-crosslinking of the polymerizable vinyl-group containing binders effected through the exposure to the UV light takes place in a fraction of a second, the color layer printed in accordance with the offset procedure is available in its final hardness on the heat transfer backing immediately after leaving the printing machine or the exposure device associated therewith in close spatial proximity, so that the papers may immediately be inspected and even stacked and packaged.

In the printing inks of the invention for manufacturing thermo-printing papers, one can use the same sublimable dyes as in the hitherto-customary intaglio printing inks or offset printing inks and as disclosed, e.g., in Swiss Pat. Nos. 572,550 and 573,311, Austrian Pat. No. 327,959 and British Pat. No. 1,433,763. Such dyes are not affected by exposure to UV light even in the presence of very active polymerization initiators. Moreover, there is no reaction between the anthraquinone or diazo dyes and the reactive monomers during ordinary storage of the printing inks or during the intensive polymerization or curing reaction which takes plce suddenly through the UV radiation, so that any doubts possibly existing against the use of such long-known radiation-hardening binders is groundless. In addition to the UV sensitizers or initiators, the printing inks of the invention may still contain other customary additives which improve the properties of the ink material for the offset printing, as well as also stabilizers against premature polymerization or cross-linking, etc.

The invention is to be explained more in detail below in reference to a few illustrative examples of printing inks of the invention for the preparation of heat-transfers.

EXAMPLE 1

For the preparation of a transfer printing ink, the following components were mixed, in which connection the components were in part premixed as customary and the components were then ground on a roller mill and processed until a homogeneous ink paste was obtained:

20 parts anthraquinone dye, disperse blue 95
330 parts trimethylolpropane-triacylate
330 parts of the reaction product of 1 mol bisphenol, 2 mols epichlorhydrin and 2 mols acrylic acid
40 parts benzophenone
30 parts Michler's ketone.

In order to set the printing consistency, 160 parts of 1:1 mixture of the above-mentioned trimethylolpropane-triacrylate and the reaction product of bisphenol, epichlorohydrin and acrylic acid were admixed to the ink paste.

The desired printing pattern was applied with the obtained printing ink by means of the offset method on a heavy machine-coated paper. The print was immediately exposed to a UV lamp (mercury medium pressure arc with 80 watts per cm arc length) for 0.2 seconds and thus dried. At a transfer temperature of 200°–220° C., the printed image was transferred to polyester fabric with a very good degree of efficiency in regard to the dye. The obtained dyed fabric exhibited excellent properties in regard to brilliance and fastness.

A transfer printing operation repeated after four weeks produced the same quality of printing.

With the obtained thermo-printing paper it was possible to produce in the same manner color patterns through transfer printing on synthetic-resin finished cotton fabric and also on polyacrylonitrile fabric.

EXAMPLE 2

A printing paste was prepared as described in Example 1, using the following materials:

10 parts disperse yellow 54
1 part disperse blue 95
300 parts trimethylolpropane-trimethacrylate
400 parts of the reaction product of bisphenol, epichlorhydrin and acrylic acid
40 parts benzophenone
30 parts Michler's ketone.

Also here the consistency was set to the value desired for the offset printing, through the addition of a mixture of the polymerizable acrylate component. Since the trimethacrylate component exhibits a lesser rate of polymerization, a drying delay had to be accepted. The time of exposure was set at 0.4 second. The obtained heat transfer possessed the same technical peroperties in regard to use, in which connection a green print was obtained.

In constrast with the prints obtained through the use of the two dyes comprising the ordinary binders which dry through oxidation, the obtained printed image remained unchanged even after long periods of storage.

EXAMPLE 3

5 parts disperse yellow 54
7 parts disperse red 4 (C.I. No. 60755) and
18 parts disperse blue 95, together with
330 parts hexandiolacrylate and 330 parts of the reaction product from bisphenol, epichlorhydrin and acrylic acid, 40 parts benzophenone and 30 parts Michler's ketone were stirred into an ink paste and the consistency desired for the offset printing was then set as described above by using the mixture of acrylate monomers.

After an exposure to UV light of 0.2 seconds, there was obtained a heat transfer which produced an excellent black image on polyacrylonitrile fiber fabric.

EXAMPLE 4

100 parts disperse red 60

10 parts disperse blue 14 (C.I. No. 61500)

300 parts epoxidized, acrylated soybean oil and 200 parts pentaerythrol-triacrylate in the presence of 7 parts benzildimethyl ketal as UV initiator were ground on a roller mill into a homogeneous ink paste. One part of micronized polyethylene wax was then added and the paste was mixed with further 100 parts of the acrylated soybean oil and 60 parts pentaerythrol-triacrylate into a printable ink mass. The printed paper was exposed as indicated in Example 1.

The technical testing concerning the use of the heat transfer produced the same results immediately after the production and after several weeks of storage.

EXAMPLE 5

200 parts disperse red 60

150 parts of a low-viscosity linseed oil alkyd (reaction product of trimethylol-propane ester of isophthalic acid)

150 parts of an oil-soluble cyclohexanone formaldehyde resin, 200 parts trimethylolpropane-triacrylate and 40 parts benzoinethylether were ground in a roller mill until a homogeneous ink paste was obtained, which was mixed with 160 parts vinyl pyrrolidone, so that a printable ink was produced. The print was exposed for 0.3 seconds to a UV radiation device. A bright red printed image was obtained on transfer printing to a synthetic-resin finished cotton fabric.

The technical testing concerning the use was performed in accordance with Example 1 amd am equivalent result was obtained.

It will be obvious to those skilled in the art that various changes may be made without departing from the scope of the invention and the invention is not to be considered limited to what is described in the specification.

What is claimed is:

1. The new use of a printing ink for thermo-transfers, said ink consisting essentially of at least one sublimable dye, at least one rapidly UV hardenable binder having polymerizable ethylenic unsaturation and a UV polymerization initiator, comprising printing said ink by the offset or letter printing method onto a heat-transfer backing, hardening the binder with UV radiation, and subsequently heat-transferring the print to a textile fabric.

2. A method according to claim 1 wherein said binder is a polyfunctional acrylate ester selected from the group consisting of trimethylolpropane-triacrylate, hexanediolacrylate and pentaerythritol-triacrylate.

3. A method according to claim 2 wherein there is additionally present the reaction product of bisphenol, epichlorhydrin and acrylic acid.

4. A method according to claim 2, wherein there is additionally present an oil soluble cyclohexanone formaldehyde resin and vinyl pyrrolidone.

5. In a method of heat-transferring an ink design from a thermo-transfer printing paper to a flexible substrate by the use of heat, the improvement wherein the transferred design has been formed by printing an ink comprising a subliminal dye and a UV hardenable binder having polymerizable ethylenic unsaturation, followed by applying UV radiation to the printed design in the presence of a UV polymerization initiator to harden the printed design.

6. A method according to claim 5 wherein the sublimable dye is an anthraquinone or diazo dye and the UV cured binder is derived from a member selected from the group consisting of trimethylolpropane-triacrylate, hexanediolacrylate and pentaerythritol-triacrylate.

7. A method in accordance with claim 5 wherein said binder is a poly-functional acrylate ester and wherein there is additionally present in the ink pattern the reaction product of bisphenol, epichlorhydrin and acrylic acid or an oil soluble cyclohexanone formaldehyde resin and vinyl pyrrolidone, and wherein said UV polymerization initiator is benzildimethyl ketal.

8. A method in accordance with claim 5 wherein said binder is an acrylate.

9. A method in accordance with claim 5 or claim 8 wherein said printing has been carried out by an offset method.

10. A method in accordance with claim 9 wherein said flexible substrate is a fabric containing synthetic resin.

11. A method in accordance with claim 1 wherein the printing has been carried out by an offset method, and said textile fabric contains synthetic resin.

* * * * *